(12) United States Patent
Abe et al.

(10) Patent No.: US 11,644,965 B2
(45) Date of Patent: May 9, 2023

(54) VEHICLE LIGHTING DEVICE

(71) Applicants: Pioneer Corporation, Tokyo (JP); Tohoku Pioneer Corporation, Yamagata (JP)

(72) Inventors: Makoto Abe, Yamagata (JP); Satoshi Suzuki, Yamagata (JP); Kenji Kawamura, Yamagata (JP); Shingo Tsuji, Yamagata (JP)

(73) Assignees: Pioneer Corporation, Tokyo (JP); Tohoku Pioneer Corporation, Yamagata (JP)

( * ) Notice: Subject to any disclaimer, the term of this patent is extended or adjusted under 35 U.S.C. 154(b) by 0 days.

(21) Appl. No.: 17/846,940

(22) Filed: Jun. 22, 2022

(65) Prior Publication Data

US 2022/0317870 A1    Oct. 6, 2022

Related U.S. Application Data

(63) Continuation of application No. 16/209,153, filed on Dec. 4, 2018, now Pat. No. 11,397,518, which is a
(Continued)

(51) Int. Cl.
*G06F 3/04847*    (2022.01)
*G06F 3/0488*     (2022.01)
(Continued)

(52) U.S. Cl.
CPC .......... *G06F 3/04847* (2013.01); *B60Q 3/80* (2017.02); *B60Q 3/82* (2017.02); *B60Q 3/85* (2017.02);
(Continued)

(58) Field of Classification Search
CPC .... B60Q 3/82; B60Q 3/80; B60Q 3/85; G06F 3/0485; G06F 3/0488; G06F 3/04847; G06F 3/04883; H05B 47/14; H05B 47/105
See application file for complete search history.

(56) References Cited

U.S. PATENT DOCUMENTS 6,390,529 B1   5/2002  Bingle et al.
7,126,583 B1  10/2006  Breed
(Continued)

FOREIGN PATENT DOCUMENTS

JP    2013-116665 A    6/2013
JP    2013169960 A     8/2013
(Continued)

OTHER PUBLICATIONS

Machine translation of Ryoichi, JP-201369960, date: Sep. 2, 2013.
(Continued)

*Primary Examiner* — Abdullah A Riyami
*Assistant Examiner* — Syed M Kaiser
(74) *Attorney, Agent, or Firm* — Procopio, Cory, Hargreaves & Savitch LLP

(57) ABSTRACT

Disclosed is a vehicle lighting device intended to improve convenience and safety. A vehicle lighting device includes a light disposed in a vehicle interior, a controller controlling the light, and a detecting unit detecting position or motion of a detecting object by detecting a detection object at a plurality of positions, and the controller controls the light when the position or motion of the detection object is detected by the detecting unit.

5 Claims, 5 Drawing Sheets

Related U.S. Application Data continuation of application No. 15/854,869, filed on Dec. 27, 2017, now Pat. No. 10,189,404, which is a continuation of application No. 15/129,293, filed as application No. PCT/JP2014/059366 on Mar. 28, 2014, now Pat. No. 9,884,586.

(51) Int. Cl.
  *H05B 47/115* (2020.01)
  *G06F 3/04883* (2022.01)
  *B60Q 3/80* (2017.01)
  *B60Q 3/82* (2017.01)
  *B60Q 3/85* (2017.01)
  *G06F 3/0485* (2022.01)

(52) U.S. Cl.
  CPC .......... *G06F 3/0485* (2013.01); *G06F 3/0488* (2013.01); *G06F 3/04883* (2013.01); *H05B 47/115* (2020.01); *G06F 2203/04104* (2013.01); *Y02B 20/40* (2013.01)

(56) References Cited

U.S. PATENT DOCUMENTS

| | | | |
|---|---|---|---|
| 9,315,151 | B2 | 4/2016 | Taylor et al. |
| 2002/0003571 | A1 | 1/2002 | Schofield |
| 2002/0080617 | A1 | 6/2002 | Niwa et al. |
| 2007/0067088 | A1 | 3/2007 | Baig |
| 2008/0159556 | A1 | 7/2008 | Ambrose |
| 2009/0074263 | A1 | 3/2009 | Higuchi |
| 2010/0007633 | A1 | 1/2010 | Juni |
| 2010/0053348 | A1* | 3/2010 | Yoshimoto ............ G06F 3/0418 345/173 |
| 2010/0295772 | A1 | 11/2010 | Alameh et al. |
| 2010/0311494 | A1 | 12/2010 | Miller et al. |
| 2010/0321758 | A1 | 12/2010 | Bugno |
| 2012/0013252 | A1 | 1/2012 | Eckel |
| 2012/0146950 | A1* | 6/2012 | Park ...................... G06F 3/0428 345/175 |
| 2013/0088147 | A1 | 4/2013 | Nakamura |
| 2013/0113993 | A1 | 5/2013 | Dagit, III |
| 2013/0141395 | A1 | 6/2013 | Homgren et al. |
| 2013/0293589 | A1 | 11/2013 | Hwang |
| 2014/0009217 | A1* | 1/2014 | Chang ................ H03K 17/9622 327/517 |
| 2014/0015977 | A1 | 1/2014 | Taylor |
| 2014/0028379 | A1* | 1/2014 | Chang ................... G06F 3/0443 327/517 |
| 2014/0070706 | A1 | 3/2014 | Fushimi |
| 2014/0070707 | A1 | 3/2014 | Nagazoe |
| 2014/0085470 | A1 | 3/2014 | Sako et al. |
| 2014/0097748 | A1 | 4/2014 | Kato |
| 2014/0183269 | A1 | 7/2014 | Glaser |
| 2014/0232695 | A1* | 8/2014 | McGaughan ......... G06F 3/0425 345/175 |
| 2014/0265934 | A1 | 9/2014 | Ramey |
| 2014/0309806 | A1 | 10/2014 | Ricci |
| 2014/0343699 | A1 | 11/2014 | Engelen et al. |
| 2015/0016695 | A1 | 1/2015 | Yoon |
| 2015/0062175 | A1 | 3/2015 | Kim |
| 2015/0067456 | A1 | 3/2015 | Kashibuchi |
| 2015/0210274 | A1 | 7/2015 | Clarke et al. |
| 2015/0253928 | A1* | 9/2015 | Yamanaka .......... G06F 3/04886 345/175 |
| 2015/0367859 | A1 | 12/2015 | Roth |
| 2016/0055676 | A1 | 2/2016 | Kasahara et al. |
| 2017/0073073 | A1* | 3/2017 | Gagnon .................. B60Q 3/82 |
| 2018/0173413 | A1 | 6/2018 | Joo et al. |

FOREIGN PATENT DOCUMENTS

| | | |
|---|---|---|
| JP | 2013237384 A | 11/2013 |
| JP | 2014-056723 A | 3/2014 |
| JP | 2009117195 A | 5/2019 |
| WO | 2012137334 A1 | 10/2012 |

OTHER PUBLICATIONS

Notice of Reasons for Refusal for related JP App No. 2018-154847 dated Oct. 29, 2019, 5 pgs.
International Search Report (ISR) dated Jul. 8, 2014; International Application No. PCT/JP2014/059366.
Japanese Official Action dated Nov. 13, 2017; Application No. 2016-509868.

* cited by examiner

VEHICLE LIGHTING DEVICE

CROSS-REFERENCE TO RELATED APPLICATIONS

This application claims the benefit of priority as Continuation of U.S. patent application Ser. No. 16/209,153, filed Dec. 4, 2018, which is a Continuation of U.S. patent application Ser. No. 15/854,869 (issued as U.S. Pat. No. 10,189,404), filed Dec. 27, 2017, which is a Continuation of U.S. patent application Ser. No. 15/129,293 (issued as U.S. Pat. No. 9,884,586), filed Sep. 26, 2016, which is a National Stage entry of PCT/JP2014/0599366, filed Mar. 28, 2014, the contents of which are incorporated herein in their entirety for all purposes.

BACKGROUND OF THE INVENTION

Filed of the Invention

The present invention is related to a vehicle lighting device.

Description of the Related Art

There is proposed an interior light as the abovementioned vehicle lighting device that reflects a light source emitting a light having directivity on a mirror, and to move the mirror in X-Y direction irradiates a spot light on an area including a predetermined point in the vehicle interior (refer to PTL 1 for example). This spot light is, for example, intended to attend to a fixing buckle to a passenger by irradiating the slot light on an area including the fixing buckle of a seat belt of a vehicle interior.

Note that when irradiating the spot light on a position in the vehicle interior a driver or a passenger wants, or changing the irradiating position, the driver or the passenger needs to operate a switch of an interior light arranged on a ceiling of the vehicle. At this time, the driver or the passenger must stretch his or her hand to the ceiling, which poses problem of inconvenience as one example.

Patent Document

PTL1: Japanese Patent Publication 2013-39845

SUMMARY OF THE INVENTION

The present invention is to attend such problem as one example. Namely, an object of the invention is to provide a vehicle lighting device to intend to improve convenience and safety.

In order to solve the abovementioned problem, the vehicle lighting device according to a first aspect including: a light arranged in a vehicle interior; a controller controlling the light; a detector including a touch panel, and detecting a position or a motion of a detection object by detecting the detection object at a plurality of positions of the touch panel, wherein the controller controls the light in accordance with a detected result when the position or the motion of the detection object is detected by the detector.

DETAILED DESCRIPTION OF THE PREFERRED EMBODIMENTS

Figure 1:
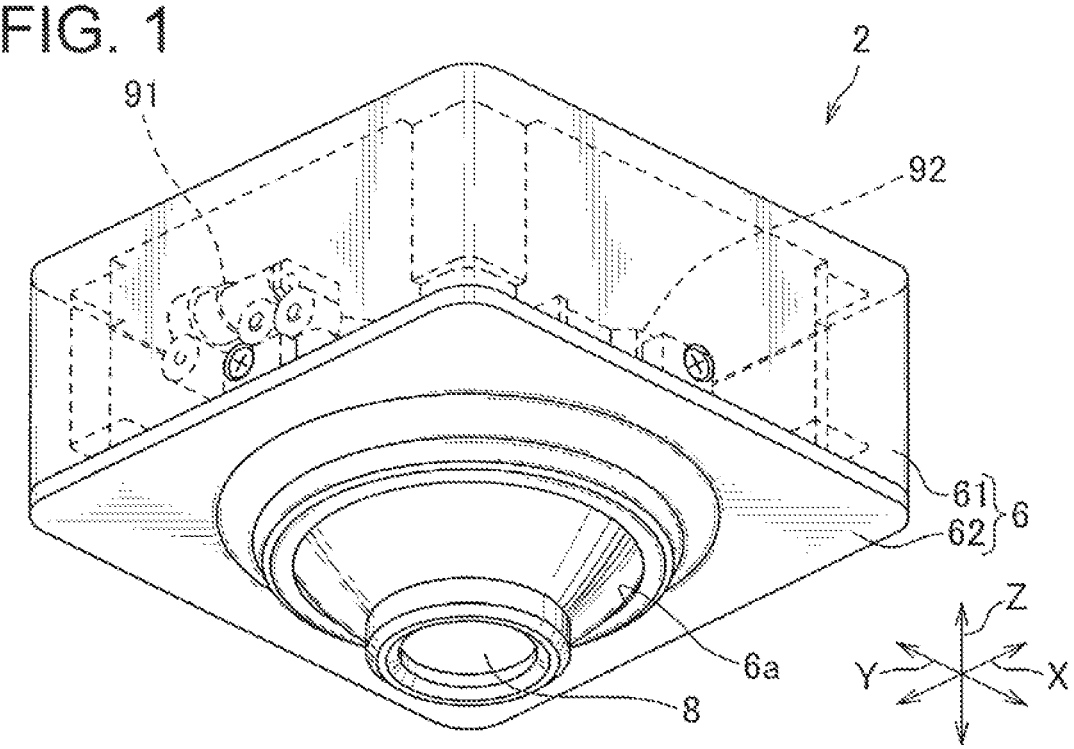
FIG. 1 is a perspective view illustrating one embodiment of a light device constituting a vehicle lighting device of the present invention.

Hereafter, a vehicle lighting device according to one embodiment of the present invention will be described. A vehicle lighting device according to one embodiment of the present invention includes: a light arranged in a vehicle interior; a controller controlling the light; a detector including a touch panel, and detecting a position or a motion of a detection object by detecting the detection object at a plurality of positions of the touch panel, wherein the controller controls the light in accordance with a detected result when the position or the motion of the detection object is detected by the detector.

It follows from this that since the position or the motion of the detection object is detected by detection of the detection object at the plurality of positions, and the light is thereby controlled, when a driver or a passenger let a spot light emit a desired position in the vehicle interior, or let an emission angle thereof change for example, the driver or the passenger can operate the light with a simple operation of only moving the detection object without operating a switch of an interior light disposed on a ceiling of the vehicle. Furthermore, an intuitive operation moving the detection object can operate the light. Thus, it is possible to improve convenience thereof.

Furthermore, the position or the motion of the detection object is detected at the plurality of positions by detection of the detection object, and malfunction can thereby be avoided. Furthermore, since the detection panel includes the touch panel, it is, especially if incorporating a portable small-sized touch panel into the detector, possible for the passenger seated on the rear sheet to make the light what is desired.

Furthermore, the detector may detect the detection object by detecting the detection object at the plurality of positions at different times from each other. This makes it possible to assuredly avoid malfunction.

Furthermore, the detection object may be a person's finger. It follows from this that an easy operation of only moving the finger can control the light.

Furthermore, an emission angle of the light may be adjustable by the controller. This makes it possible to adjust the emission angle of the light with intuitive and easy operation.

Furthermore, the motion of the person's finger may the pinch-in motion closing two fingers or pinch-out motion separating the two fingers, with the person's two fingers touching the touch panel. It follows from this that an easy operation only of the pinch-in motion or pinch-out motion by two fingers can adjust the emission angle of the light, namely, an irradiating range.

Furthermore, the pinch-in motion may be made such that the emission angle of the light is made smaller, and the pinch-out motion may be made such that the emission angle of the light is made larger. Thus, since the person readily ascertains a relationship between a direction of moving the finger and emission angle of the light, namely, a magnitude of the irradiating range, it is possible to operate the light with more intuitive operation.

Furthermore, the intensity of the light may be adjustable by the controller. This makes the light intensity of the light operable with intuitive and easy operation.

Furthermore, the motion of the person's finger may be two-finger scrolling to scroll, with the person's two fingers touching the touch panel. This makes the light intensity of the light adjustable with a simple operation of scrolling with two fingers.

Furthermore, the light intensity of the light may become larger upon scrolling toward upside of the touch panel in the two-finger scrolling, and become smaller upon scrolling toward downside of the tough panel. This makes the light intensity of the light further operable with intuitive and simple operation due to ready ascertainment intuitively by a person of the correspondence between the direction of moving the finger and the light intensity of the light.

Furthermore, the touch panel may be provided with the guiding part guiding upward or downward motion of the person's finger. This makes the light controllable while readily ascertaining the position of the touch panel even though the position of the touch panel cannot be sighted.

Furthermore, the emission direction of the light may be displaceable by the controller. This makes the emission direction of the light displaced with intuitive and simple operation.

Furthermore, the motion of the person's finger may be swipe motion in which the person's finger trances with its touching the tough panel or flick motion. This makes the emission direction of the light, that is, an irradiating position displaced with easy operation of only swiping or flicking the finger.

Furthermore, the swipe motion or flick motion may displace the emission direction of the light in the same direction as the motion of the person's finger. It follows from this that since person readily intuitively ascertains correspondence between the direction of moving the finger and the emission direction of the light, that is, the irradiating position, it is possible to operate with further intuitive and easy operation.

Furthermore, the chromaticity of light the light emits may be adjustable by the controller. This makes the chromaticity of light the light emits adjustable with intuitive and easy operation.

Furthermore, the motion of the person's finger may be two-finger scrolling with the person's two fingers touching the touch panel. This makes the chromaticity of light adjustable with such easy operation as scrolling two fingers.

Furthermore, the controller may control not to irradiate a predetermined area. Especially, in the case of the light intensity being large, the controller may control the light not to irradiate the predetermined area or to turn off. It follows from this that since a driver's face or a driver's face in a vehicle running behind or vicinity thereof comes beyond the irradiating area, it is possible to improve safety.

Furthermore, the predetermined area includes one of the driver's face and the rear window, or both the driver's face and the rear window. This makes the vicinity of the driver's face or the rear window or the like come beyond the irradiating area, further improving safety.

EXAMPLES

Figure 2:
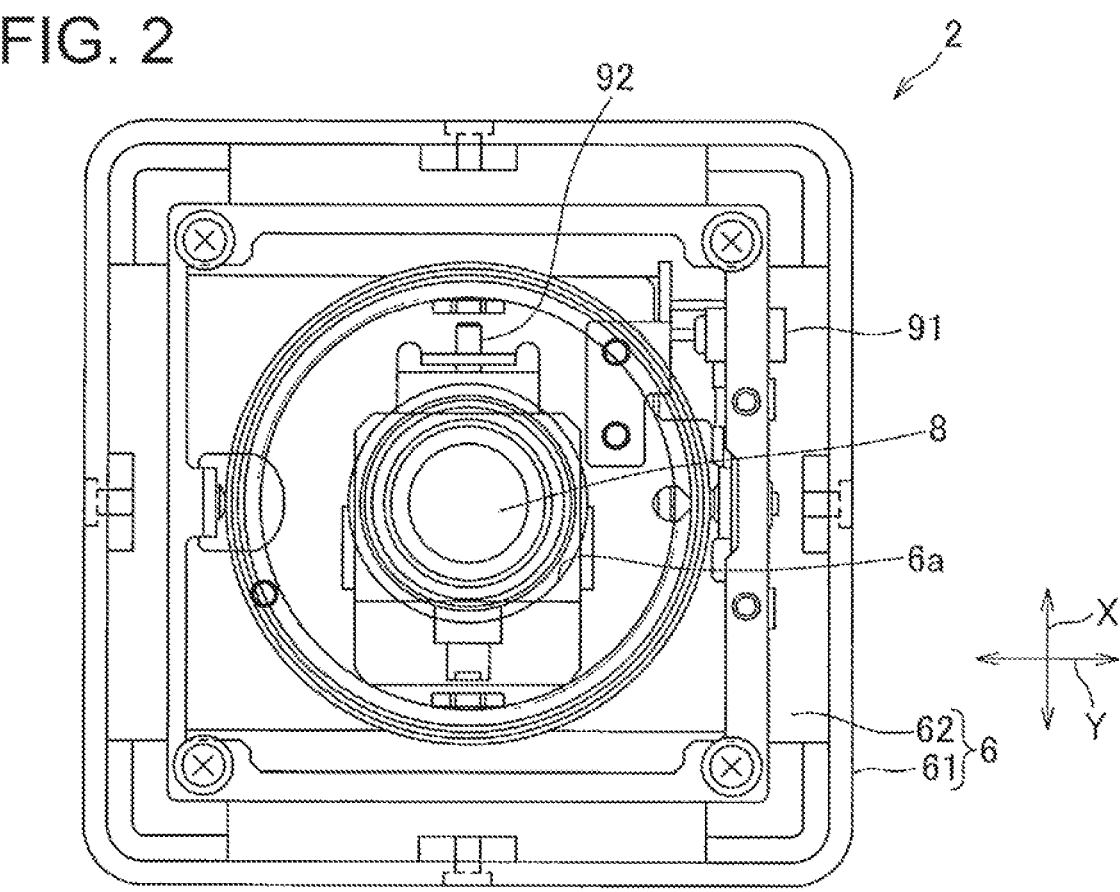
FIG. 2 is a plane view taking the light device illustrated in FIG. 1 viewed from a light source side, and illustrating an interior thereof by full line.
Figure 3:
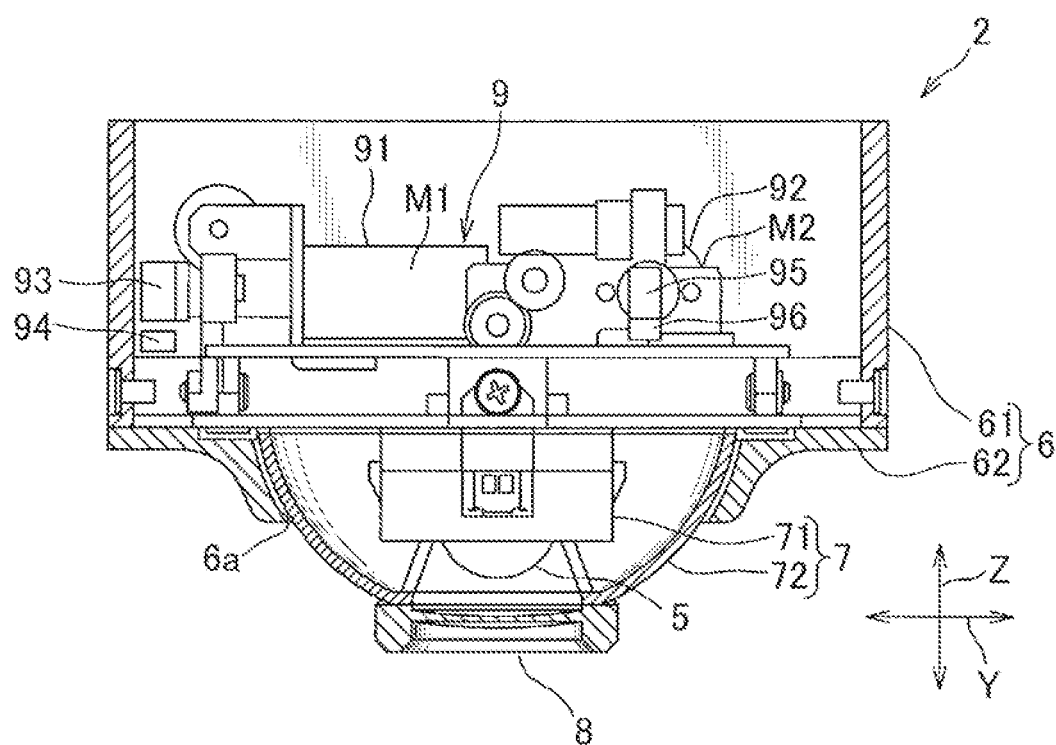
FIG. 3 is a cross-sectional view illustrating the light device illustrated in FIG. 1.
Figure 4:
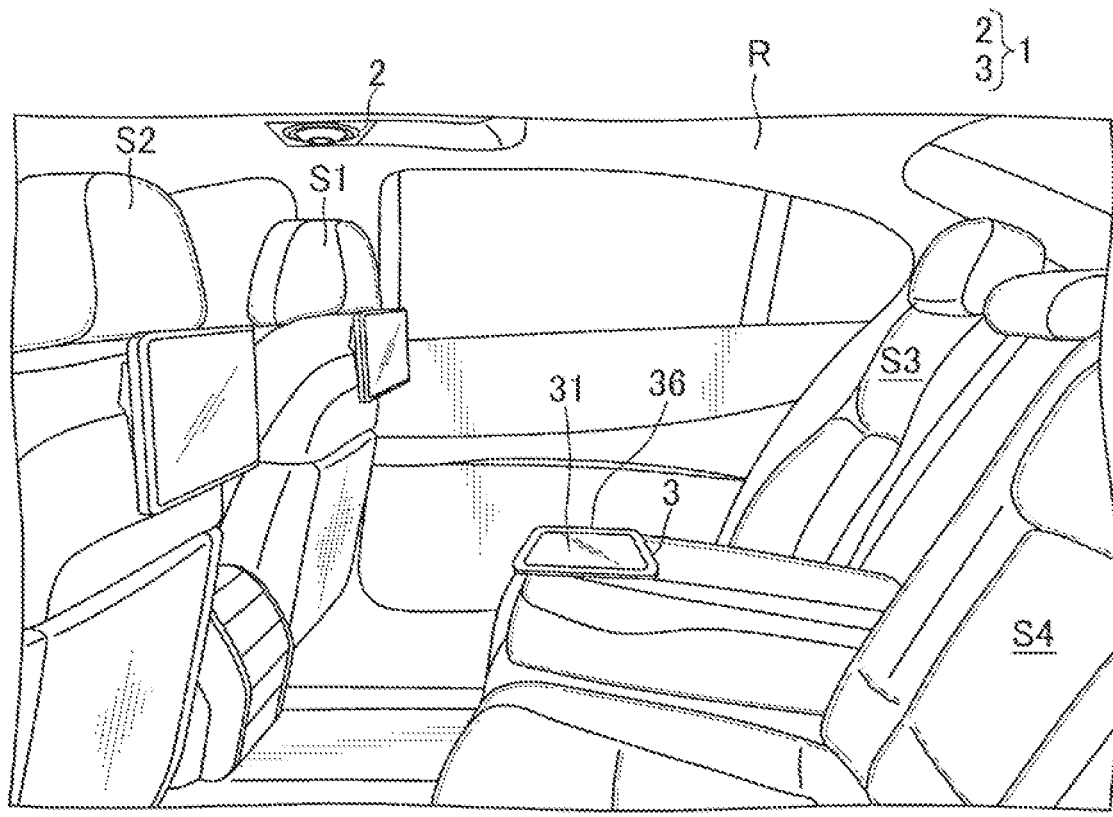
FIG. 4 is a perspective view for explaining an arrangement position of the vehicle lighting device in a vehicle, illustrated in FIG. 1.
Figure 4:
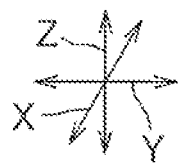
Figure 5:
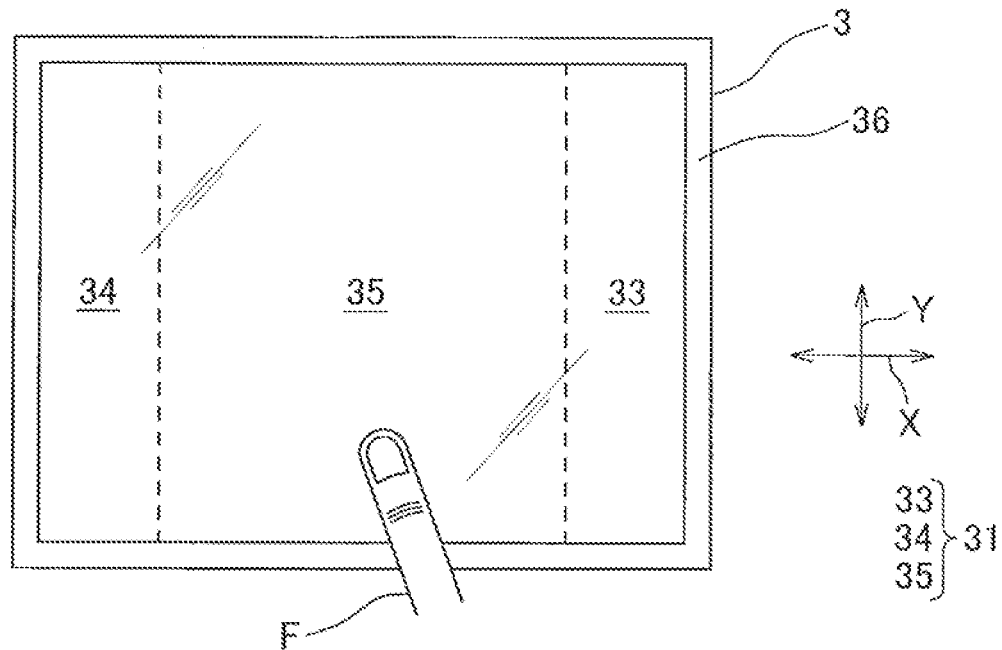
FIG. 5 is a plane view illustrating a terminal constituting the vehicle lighting device illustrated in FIG. 1.

Hereafter, with reference to FIGS. 1 to 7, a vehicle lighting device according to one embodiment of the present invention will be described. This vehicle lighting device 1 is, as shown in FIGS. 1 and 4, provided with one lighting device 2 and a terminal controlling the lighting device 2. The lighting device 2 is, as shown in FIGS. 1 to 3, configured to be provided with a light source 5 (light), a case 6 holding the light source 5, an emission angle changing structure 8 changing emission angle of the light source 5, and an emission direction changing structure 9 changing emission angle of the light source 5. The terminal 3 is, as shown in FIG. 5, provided with a touch panel 31 detecting a motion of a person's finger F as a detection object, a CPU 3 (controller shown in FIG. 6) controlling the emission angle changing structure 8 and the emission direction changing structure 9, and a resin-made frame 36 (a guide part) for protecting circumference of the touch panel 31.

The light device 2 is, as shown in FIG. 4, attached to a ceiling R of the vehicle for example, and the light source 5 is arranged so as to irradiate a side of a driver or passenger, that is, a downside.

The light source 5 is, as shown in FIGS. 2 and 3, fixed to a rotating body 7 to be mentioned later, displaceably held by the case 6. In the present example, a color variable LED is used as the light source 5. The color variable LED is changed into a color composed of predetermined three primary colors in accordance with a detected result by the touch panel 31. Furthermore, the color variable LED is changed to a predetermined light intensity in accordance with a detected result by the touch panel 31. Note that as the light source 5, though the color various LED is not used, LED, organic EL or other various lights may be used that is/are changed into the color composed of the predetermined three primary colors in accordance with the detected result by the touch panel 31 and changed to the predetermined light intensity in accordance with the detected result by the touch panel 31.

The case 6, as shown in FIG. 3, has an opening (not shown), is formed into a box shape, and is provided with a case main body 61 to be attached to the ceiling R of the vehicle, and a plate-like cover 62 covering this case main body 61. The cover 62 is provided with an exposing hole 6a arranging a rotating body 7 therein. The case 6 holds the light source 5 via the rotating body 7.

The rotating body 7 is, as shown in FIG. 3, provided with a disc-like light source holder 71, and a lens holder 72 formed into a dome shape, and holding the emission angle changing structure 8. The light source holder 71 in initial state holds the light source 5 so as to turn downward. Herein, the initial state is an initial state in which the emission angle is not changed, and for example in the present example, is a state in which the light source 5 is held so that an emission direction turns vertically downward.

The lens holder 72 is formed into an inverse conical shape such as for its diameter to shrink downward, that is, general dome shape. To this lens holder 72, an electrical focus variable lens as an emission angle changing structure 8 is fixed where light from the light source 5 emits. The light source 5 and the emission angle charging structure 8 are arranged where to be straightly aligned.

Such rotating body 7 is made that the light source 5 (color variable LED) and the emission angle changing structure 8

(electrical focus variable lens) are fixed to be straightly aligned. Furthermore, the rotating body 7 is held displaceablely in 360 degrees by the emission direction changing structure 9. As such displacement of the rotating body 7 displaces the color variable LED and the electrical focus variable lens in 360 degrees toward the same direction (same orientation).

For the emission angle changing structure 8, an electrical focus variable lens (EL-10-30 series, made by Opt Science CO., LTD.) may be used as shown in FIG. 3. This electrical focus variable lens moves a focus lens by changing lens curvature in accordance with a detected result by the touch panel 3. Thus, the electrical focus variable lens, by moving a focal distance from the light source 5, namely by varying the emission angle, collects or radiates light from the light source 5. Note that as the emission angle changing structure 8, without using the electrical focus variable lens, a lens or a filter may be used capable of collecting or 5 radiating light by moving the focal distance of light from the light source 5.

The emission direction changing structure 9 is, as shown in FIG. 3, provided with a fixture table (not shown) held by the case 6, a first driving structure 91 inclining the rotating body 7 toward the Y direction, and a second driving structure 92 inclining the rotating body 7 toward the X direction, to which the rotating body 7 is fixed. The first driving structure 91 is held by the fixture table. The second driving structure 92 is held by the fixture table via the first driving structure 91. Thus, the second driving structure 92 interlocks a motion of the first driving structure 91 toward Y direction, and is displaced toward the Y direction. Note that, in the present example, the Y direction denotes a traveling direction of the vehicle, the X direction a width direction of the vehicle perpendicular to the traveling direction.

The first driving structure 91 is provided with a first motor M1, a first magnet 93 attached to a rotating shaft of the first motor M1, a first hall element 94 detecting a magnetic variation of the first magnet 93, and a first movable table (not shown) inclined toward the Y direction by driving of the first motor M1. The first motor M1 is held by the fixture table, and its rotating shaft is arranged extending in the Y direction. The first movable table is formed into a disc shape, and its middle part is pivotally supported by the fixture table via a shaft.

The second driving structure 92 is provided with a second motor M2, a second magnet 95 attached to a rotating shaft of the second motor M2, a second hall element 96 detecting a magnetic variation of the first magnet 95, and a second movable table (not shown) inclined toward the X direction by driving of the second motor M2. The second motor M2 is arranged such that the rotating shaft thereof extends toward the X direction. The second movable table is formed into a disc shape. And the first movable table, the second movable table, and the rotating body 7 are vertically and coaxially arranged in sequence. Furthermore, a middle part of the second table is pivotally supported by the first movable table.

Such emission direction changing structure 9 each moves the first motor M1 and the second motor M2 in accordance with the detected result by the touch panel 31, displaces the first movable table and the second movable table, and displaces in 360 degrees the rotating body 7 held by these movable tables, namely, color variable LED that is the light source 5 and the electrical focus variable lens that are the emission angle changing structure 8. Herein a displacement quantity (inclination) of the rotating body 7 can be obtained from an output of the first and second hall elements 94, 96.

Thus, the emission direction changing structure 9 inclines the rotating body 7 in a direction user wants, and subsequently change the emission direction of the light emitted from the light source 5 toward the direction the user wants.

Herein, "changing the emission direction of the light source 5" includes changing a light axis of the light source and changing a direction of an emission inlet of light. Furthermore, in the case that the light source 5 is provided with a cover 62 covering the light source 5, changing a direction of an emission face the cover 62 has is also included.

Note that the abovementioned emission direction changing structure 9 is one example of configuration to change in 360 degrees the rotating body 7 as well as the light source 5 and the emission angle changing structure 8 (electrical focus variable lens), but may be any other configurations if only changing the rotating body 7, namely, the emission direction of the light source 5. Furthermore, in the present example, an orthogonal coordinate system is used for the emission direction changing structure 9, but may be used a spherical coordinate system or a cylindrical coordinate system if only changing the emission direction of the light source 5.

Such light source device 2 is, as shown in FIG. 4, attached to the ceiling of the vehicle. Furthermore, as shown in the same figure, the tough panel 31 is, with its top face along horizontally, fixed to a door near a rear seat S3 behind a driver's seat. In the present example, one example will be explained in which the light source device 2 is arranged on the ceiling R in the middle of the driver's seat S1, assistant driver's seat S2, the rear seat S3 behind the driver's seat, and the rear seat S4 behind the assistant driver's seat. When the user, with the light source 5 turned off, touches with one finger vicinity corresponding to the rear seat S4 behind the assistant driver's seat on the touch panel 31, the light from the light source 5 turns toward the rear seat S4 behind the assistant driver's seat. Furthermore, the user, with the light source 5 turned on, performs swipe motion or flick motion with two fingers, the emission direction changes in the same direction as moves the person's finger F. For example, as shown in FIG. 5, when the person's finger moves rightward from a touch position of the finger F of the touch panel 31, the emission direction of the light emitted from the light source 5 is changed from the rear seat S4 behind the assistant driver's seat to the rear seat S3 behind the driver's seat.

The touch panel 31 is, as shown in FIG. 5, formed into a rectangular shape which is panel-like shaped. This touch panel 31 is configured such that a plurality of sensors is aligned lengthwise and widthwise regularly in a reticular pattern. This touch panel 31 is arranged such that its top face lies along horizontally, its length direction width direction (X direction), its width direction traveling direction (Y direction).

Furthermore, the touch panel 31 is provided with a first sensor 33 that is a detecting means for controlling light intensity of light, a second sensor 34 that is a detecting means for detecting the chromaticity of light, and a third sensor 35 that is a detecting means for detecting the emission angle and the emission direction. In the present example, the first sensor 33 is disposed at right side end seen from the user, the second sensor 34 at a side end further left than the first sensor 33, the third sensor 35 between the first sensor 33 and the second sensor 34.

The frame 36 is provided protruding more than the touch panel 31, and guides upward or downward motion of user's finger F at a step of the touch panel 31 and the frame 36.

Note that, in the present example, one example is explained in which the emission direction of the light source 5 changes toward each of seats S3, and S4, but the emission direction of the light source 5 may not turn toward each seat. The emission direction of the light source 5 for example may emit toward outside of the vehicle (for example, one's foot on opening a door).

Furthermore, while in the present example one example is explained of having one light device 2, the light source 2 may be provided two or more. In that case, the light source 2 may each be provided at vicinity of seats S1, S2, S3, and S4, or may be provided at any positions in the vehicle. Furthermore, one terminal 3 is, while in the present example provided for one light device, may be provided for a plurality of light devices, or the same number may be provided so as to control each of the plurality of light devices.

Furthermore, in the present example, the touch panel 31, that is, the terminal 3 is fixed to the door near the rear seat S3 behind the driver's seat, but the present invention is not limited thereto. The terminal 3 may be fixed to any position in the vehicle, or may be detachably disposed at any position in the vehicle.

Furthermore, in the present example, the touch panel 31 includes the first sensor 33, the second sensor 34, and the third sensor 35, and these first, second, third sensors 33, 34, 35 are arranged alongside, but the present invention is not limited thereto. The first, second, and third sensors 33, 34, 35 may be arranged vertically, or may each be arranged at any position. Furthermore, the first sensor 33 is the detecting means for controlling light intensity of light, the second sensor 34 for controlling the chromaticity of light, the third sensor 35 for controlling the emission angle or emission direction of light, but the present invention is not limited thereto. The sensors 33, 34, 35 located at any position may execute any kind of controls as far as controlling the light source 5.

Furthermore, in the present example, the frame 36 is used for the guide part, but the present invention is not limited thereto. The guide part may be a projecting member vertically extending disposed over the touch panel 31, and for example may be a projection vertically and straightly disposed spaced at equal intervals. The projecting member or the projection may be a part of the touch panel 31, or a resin-made separate member from the touch panel 31 for example. In the case that the projecting member or projection is the part of touch panel 31, the light source 5 may be controlled by tracing the projecting member or projection in an extending direction thereof.

Figure 6:
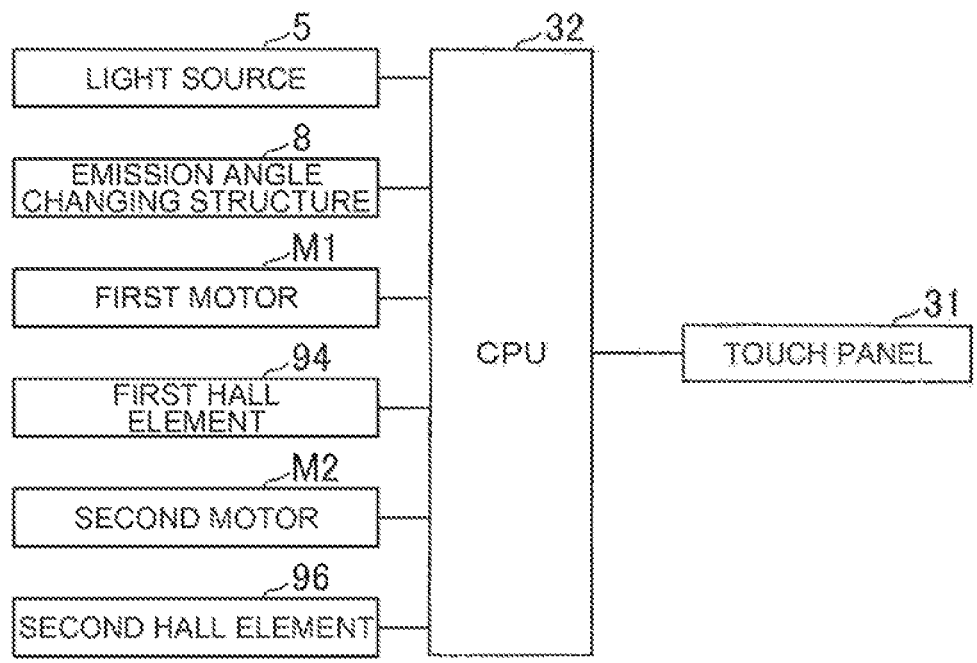
FIG. 6 is an electrical block diagram of the terminal illustrated in FIG. 5.

Next, an electrical configuration of the abovementioned configured vehicle device 1 is explained with reference to FIG. 6. The CPU 32 is, as shown in FIG. 6, constituted of microcomputer for example, to control drive of two motors M1, M2 (emission direction of light), a magnitude of the light intensity of the light source 5, color of the light source 5, and the emission angle (curvature of lens) of the light source 5.

Herein, the CPU 32 detects the motion of the finger F by detecting the position of the user's finger F at a plurality of positions on the touch panel 31 at different times. In detail, when the finger F moves, with the finger F touching the touch panel 31, the motion of the finger is detected. Thus, the CPU 32, while avoiding malfunction, can exactly detect the motion of the finger F.

In the present example, the CPU 32, when detecting the action (contact) by the user's one finger, turns on the light source 5. At this time, the CPU 32 tilts the rotating body 7 toward a position in the vehicle corresponding to an absolute coordinate position of the touch panel 31 the user touches. Herein, the CPU 32, when detecting the absolute coordinate position the finger F touches on the touch panel 31, controls the motors M1, M2, to correspond to the absolute coordinate position, so as to tilt the rotating body 7. Thus, the emission direction of the light source 5 turns toward an area of the vehicle corresponding to the absolute coordinate position on the touch panel 31. Furthermore, the CPU 32, upon the light source 5 turning on, detects a given time having passed, with the user touching finger on the touch panel 31, and then turns off the light source 5.

Furthermore, the action of user's one finger (swipe motion or click motion) is detected during the light source being turned on. Namely, the touch panel 31 detects whether the user's finger F moved from a motion starting coordinate position to a motion destination coordinate position. Furthermore, the CPU 32, when detecting a relative coordinate between which the finger F moved on the touch panel 31 (coordinate representing a relative position between the motion starting coordinate position and the motion destination coordinate position), controls each of the motors M1, M2, so as to correspond to the relative coordinate, and tilts the rotating body 7. Thus, the emission direction of the light source 5 turns toward the area of the vehicle corresponding to the relative coordinate. Note that the swipe motion is an operation that the user's finger slowly traces the surface of the touch panel 31, the flick motion an operation that the user's finger traces the surface of the touch panel 31 in such a manner as flicking.

Furthermore, the CPU 32 controls the irradiating range of the light 5 not to exceed the predetermined area in the vehicle. Namely, the CPU 32 controls the light from the light source 5 not to emit toward the predetermined area. This allows the vehicle light device 1 not to irradiate light from the light source 5 to a vicinity of the driver's face or a rear window. Thus since the light from the light source 5 does not emit to the driver or a vicinity of a driver who drives a vehicle running behind, safety can be improved. Furthermore, the CPU 32, when the light intensity is larger than predetermined, controls that the irradiation range does not exceed the predetermined area, or to tune off. This hinders the light from illuminate the vicinity of the face of the driver or the drivers in the vehicle traveling behind, thus improving the safety.

Furthermore, the CPU 32 controls such that detection of upward-scrolling with two fingers touching the first sensor 33 of the touch panel 31 increases the light intensity of light by what corresponds to a motion value by which the two fingers moves upward.

Furthermore, the CPU 32 controls such that when upward-scrolling with the two fingers touching the second sensor of the touch panel 32 is detected, chromaticity the light source 5 emits changes from blue to green, and to red in colors of which wave length gradually becomes longer by a step corresponding to the motion value the two fingers moves upward. Furthermore, the CPU 32 controls such that when downward-scrolling with the two fingers touching the second sensor 34 of the touch panel 31 is detected, chromaticity the light source 5 emits changes from red to green, and to blue in colors of which wave length gradually becomes shorter by a step corresponding to motion value the two fingers moves downward.

Furthermore, the CPU 32 may control color to become a value corresponding to one corresponding to Y coordinate respective to predetermined X coordinate using chromaticity diagram (CIE931) regulated by CIE (International Commission on Illumination) for example, (that is, X coordinate is a fixed value, Y coordinate variable value corresponding to detection).

Otherwise, the CPU 32 may control color of light source 5 so as to become the color according to the coordinate of CIE such that scrolling vertically or horizontally with the two fingers touching the second sensor 34 is detected, the color of the light source 5 becomes the color of coordinate corresponding to the motion value of the two finger. In this case, horizontal axis (X) and vertical axis (Y) denote colors in CIE 1931, and a color of X=0.33, Y=0.33 denotes achromatic color (white), and the color may thereby be set to be X=0.33, Y=0.33, namely achromatic (white) before chromaticity of light the light source emits is controlled. Namely, the chromaticity of light the light source 5 emits may be set to be its initial value of X=0.33, Y=0.33. Thus, the color is controlled to be green when the user's two fingers, as the color of X=0.33, Y=0.33 being a starting point, moves in an upper left direction, to be blue when moves in a lower left direction, and to be red when moves in lower right.

Furthermore, when detecting pinch-in (a motion in which two fingers, with touching the touch panel 31, close to each other) in the third sensor 35 of the touch panel 31, the CPU 32 controls the emission angle of the light source 5 to become small by a value corresponding to the motion quantity by which the two fingers close.

Furthermore, the CPU 32 detects pinch-out (a motion in which two fingers, with touching the touch panel 31, separate from each other) in the third sensor 35 of the touch panel 31, the CPU 32 controls the emission angle of the light source 5 to become large by a value corresponding to the motion quantity by which the two fingers separate.

Figure 7:
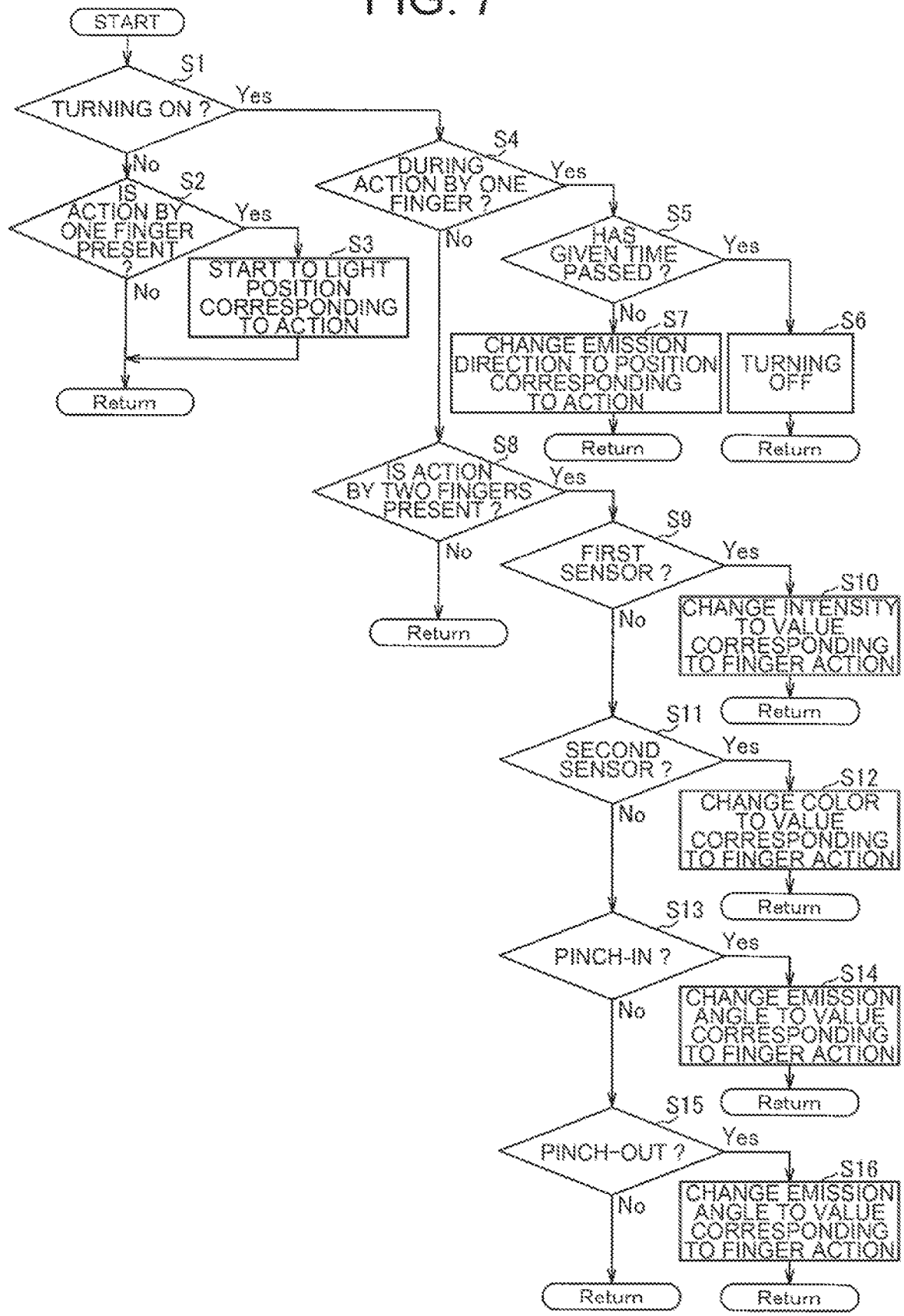
FIG. 7 is a flow chart illustrating procedure of a CPU illustrated in FIG. 6.

Next, a detailed motion is explained with reference FIG. 7 of the vehicle lighting device 1 as configured above. FIG. 7 is a flowchart illustrating procedure of the CPU 32 illustrating in FIG. 7. As shown in the figure, the CPU 32 starts an action corresponding to an ignition-on for the vehicle for example. Firstly the CPU 32 determines whether the light source 5 is turned on (step S1). If it is found to be turned on, the procedure advances to step S2.

In contrast, if it is not found to be turned-on (N in Step S1), the CPU 32 determines whether an action by one finger is present or not. The action in this step S2 denotes tapping. Herein the tapping is an operation of touching the surface of the touch panel 31 for an instant, like tapping the surface.

If any action by one finger (Y in step S2) exists, light from the light source 5 is emitted to a position corresponding to the absolute coordinate position in the third sensor 35 of the touch panel 31 (step S3). Namely, lighting stars while the emission direction is changed. If no action by one finger exists (N in step S2), procedure returns to step S1.

On the other hand, if during turning-on, the action to the touch panel 31 by one finger is detected (Y in step S4), and a given time has passed with the finger touching the touch panel (Y in step S5), the CPU 32 turns off the light source 5 (step S6), and returns to step S1. In contrast, the action by one finger is detected (Y in step S4), and a given time has not passed (N in step S5), the CPU 32 changes the emission direction to the position corresponding to the action (step S7), and the procedure is turned to step S1. The action in the step S7 denotes swipe motion or flick motion. Herein, the CPU 32, when detecting touching by the finger F at a plurality of positions on the touch panel 31 at each different time, determines whether the swipe motion or the flick motion is performed. As such, the touch panel 31, by detecting the finger F at the plurality of positions at each different time, detects the motion of finger F. This exactly avoids malfunction. Note that swipe motion denotes an operation that the user's finger slowly traces the surface of the touch panel 31, flick motion an operation that the user's finger traces the surface of the touch panel 31 in a fashion of flicking.

In the case that the action of the touch panel 31 by one finger is not detected (N in step S4), and the action by two fingers is detected (Yin step S8), the CPU 32 determines whether action is detected in the first sensor 33 on the touch panel 33 (step S9). In the first sensor 33, When the action is detected (Y in step S9), the CPU 32 changes the light intensity of the light source 5 to become the value corresponding to the finger motion (step S10) and returns to step S1. The action in step 9 denotes scrolling by two fingers that user's two fingers, with touching the touch panel 31, upward or downward scrolls. At this time user's finger is guided upward or downward by a step between the frame 36 and the touch panel 31. This makes the position of the touch panel 31 readily ascertained and light source 5 controlled though not sighting the touch panel 31.

The light intensity of the light source 5 is controlled by the CPU 32 such as to become larger upon the two fingers scrolling upward on the touch panel 31, or to become smaller upon scrolling downward on the touch panel 31. It follows from this that since the person sensitively ascertains the correspondence between the moving direction of the finger F and the magnitude of the light intensity of the light source 5 (light), the light can intuitively and readily be operated.

In the first sensor 33, in the case of the action not be detected (N in step S9), the CPU 32 determines whether the action is detected in the second sensor 34 or not (step S11). In the second sensor 34, the action is detected (Y in step S11), the CPU 32 changes the color of the light source 5 such as to become the value corresponding to the finger motion (step S12), and then returns to step S1. The action in step S12 denotes upward or downward two-finger scrolling, with user's two fingers touching the touch panel 31. At this time the motion upward or downward further than the frame 36 of user's finger F is guided. This makes light source 5 controlled while the position of the touch panel 31 is readily ascertained even though the position of the touch panel 31 cannot be sighted.

The color of the light source 5 is controlled by the CPU 32 to change to blue, green and red of which the wave length gradually become longer upon upward scrolling in the two-finger scrolling on the touch panel 31, and to red, green, and blue of which the wave length gradually becomes shorter upon downward scrolling. It follows from this that since the correspondence between the direction in which the finger F moves and the magnitude of the color of the light source 5 (light) is readily ascertained, intuitive and ready operation makes it possible to control the light.

In the second sensor 34, when the action is not detected (N in step S11), the CPU 32 determines whether pinch-in motion is detected in the third sensor 35 (step S13). In the third sensor 35, when pinch-in motion is detected (Yin step S13), the CPU 32 changes the emission angle to become smaller so as to become the value corresponding to the finger motion (step 14), and returns to step 1. Furthermore, in the third sensor 35, when pinch-out motion is detected (Y in step S13), the CPU 32 changes the emission angle to become larger so as to become the value corresponding to the finger motion (step 15), and returns to step 1. Herein, the pinch-in motion is that user's finger F, with user's two fingers touching the touch panel 31, close to each other, pinch-put motion is that user's fingers F, with user's two fingers touching the touch panel 31, separate from each other. Thus, easy operation of only pinch-in motion or pinch-out motion by two fingers F can adjust the emission angle of light source 5 (light), that is, the irradiation range. Furthermore, since person readily ascertains the correspondence between the motion direction of finger and the emission angle of light, that is, the irradiation range, more institutive operation can operate the light.

According to the abovementioned example, the light source 5 (light) arranged in the vehicle interior, the CPU 32 (controller) controlling the light source 5, and the touch panel 31 (detecting means) detecting position and motion of the finger F by detecting user's finger (detection object) at the plurality of positions are provided, and when the touch panel 31 detects position and motion of the finger F, the touch panel 31 controls light source 5 in accordance with the concerned detection result.

It follows from this that since the position or motion of the finger is detected and the light source is controlled by detecting the plurality of positions for example, when the driver or passenger turns a spot light to a desired position in the vehicle interior, or changes the emission angle, the driver or passenger, without operating the light device 2 disposed on the ceiling of the vehicle or the like, can operate the light source 5 with an easy operation of moving the finger F. Furthermore, the institutive operation of moving the finger can operate the light source 5. It is therefore possible to improve its convenience.

The detection of the position or motion of the finger F by detecting the plurality of positions of the finger F can avoid malfunction.

Furthermore, the touch panel 31 detects the motion of the finger F by detecting the finger F at different times at the different positions. This makes it possible to avoid malfunction more definitely.

Furthermore, the finger F is person's finger. This makes the light source 5 controlled by easy operation of only moving the finger.

Furthermore, the present example is configured to include the touch panel. But the detecting means may be not the touch panel dedicated to the light device. The detecting means may be configured to include the touch panel, and may be the touch panel for a smart phone, laptop computer, or game machine.

Furthermore, in the present example, change of the light intensity of the light, the color, the emission angle, or the direction of the emission is explained as one example of the control of the light, the present invention is not limited thereto. Control may be any one as far as it is a control for light, and any position or motion may be preferred as far as the position or motion of the person's finger as detection object controlling the light can be detected at different positions by the detecting means.

Furthermore, in the present example, with regard to operation for the CPU 32 as controller to detect the person's finger at the plurality of positions at different positions, pinch-in motion, pinch-out motion, two-finger scrolling, swipe motion, flick motion or the like is explained as the one example, but the present invention is not limited thereto. The controller may detect the person's finger (detection object) at the plurality of positions at the same time. Namely, controller controls the light by touching two fingers at the same time on the touch panel 31.

Furthermore, in the present example, the example is explained as one example that the detection object is person's finger, but the present invention is not limited thereto. Sensing member such as touch pen sensed by the touch panel 3 may also be preferred.

Those skilled in the art can implement the invention varying in many types without departing from the gist of the present invention following conventional knowledge. The concerned variations, as far as still including the configuration of the vehicle lighting device of the present invention, should of course be included in the scope of the present invention.

DESCRIPTION OF SYMBOLS 1 vehicle lighting device
5 light source (light)
31 touch panel (detecting means)
32 CPU (controller)
F finger (detection object)

The invention claimed is:

1. A vehicle lighting device comprising:
a light device arranged in an interior of an automobile; and
a touch panel for controlling the light device, wherein the touch panel includes a first area, a second area and a third area,
wherein a direction of lighting emitted by the light device is changed according to contact of a detection object with the first area or motion of a detection object on the first area,
wherein a light intensity of the light device is changed according to contact of a detection object with the second area or motion of a detection object on the second area, and
wherein an irradiating area of the light device is changed according to contact of a detection object with the third area or motion of a detection object on the third area.

2. The vehicle lighting device according to claim 1, wherein the direction of lighting emitted by the light device is changed according to a direction in which the detection object moves while being in contact with the first area.

3. The vehicle lighting device according to claim 1, wherein the light intensity of the light device is increased when the detection object moves in one direction while being in contact with the second area, and
wherein the light intensity of the light device is decreased when the detection object moves in a direction opposite to the one direction while being in contact with the second area.

4. The vehicle lighting device according to claim 1, wherein the light device is separated from the touch panel.

5. The vehicle lighting device according to claim 1, wherein the light device includes at least one LED.

* * * * *